June 14, 1932.  L. B. SMITH ET AL  1,863,071
FILTER PRESS
Filed Nov. 15, 1929
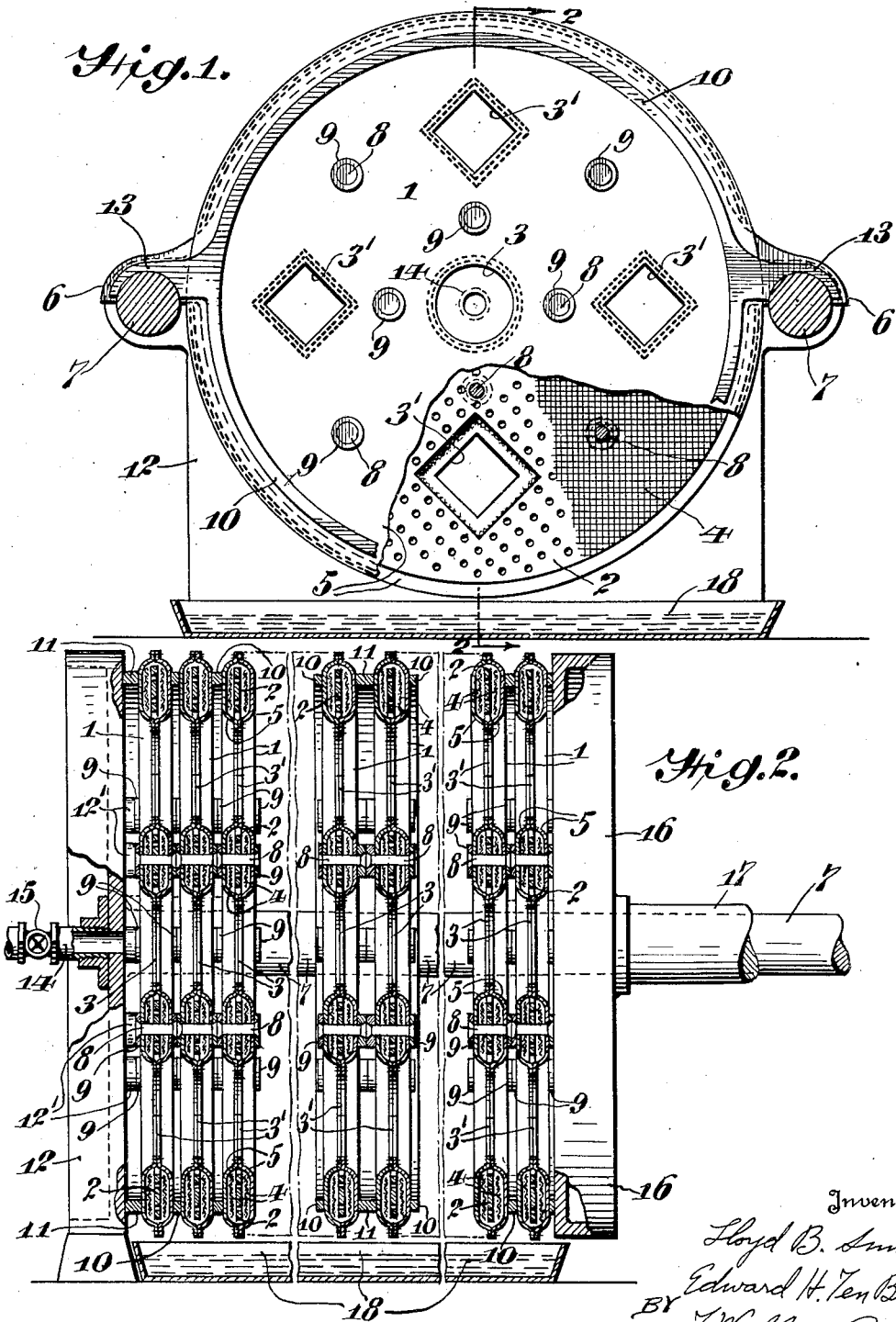

Patented June 14, 1932

1,863,071

UNITED STATES PATENT OFFICE

LLOYD B. SMITH, OF MOORESTOWN, NEW JERSEY, AND EDWARD H. TEN BROECK, OF PHILADELPHIA, PENNSYLVANIA, ASSIGNORS TO THE ATLANTIC REFINING COMPANY, OF PHILADELPHIA, PENNSYLVANIA, A CORPORATION OF PENNSYLVANIA

FILTER PRESS

Application filed November 15, 1929. Serial No. 407,423.

Our invention relates to improvements in filtering, including improvements in filter presses. More particularly our invention relates to improved filtering plates and their arrangement within such presses.

Our improved structure as a whole is particularly adapted for the filtration after chilling of paraffine wax from petroleum oil. However, it is to be understood that it may be used for the separation of solids from liquids generally.

A typical filter press now in general use is one in which the solid liquid mixture to be separated is introduced into the press under pressure, through a single inlet usually in the center of one end thereof called the "feed end". The press is provided with plates which in number may be of the order of five hundred, more or less, said plates being spaced apart by suitable members, and held in horizontal alignment and against such members by a plunger at the opposite end of the press, sufficient pressure being exerted against the plunger to prevent any leakage of liquid and/or solid from taking place between the faces of the spacer members and the portions of the plates with which they contact. There is an opening or aperture in each plate usually at the center, which aligns with similar openings or apertures in the other plates and with the inlet through which the mixture to be filtered is introduced into the press. The pressure upon the mixture as it passes into the press is such that in a very short time after the press has been put "on stream" it is substantially completely filled with the mixture. The liquid passes through the canvases of the several plates, thence to and from the lowermost portions of the plates into a collecting pan, while the solid builds up in the spaces between the plates.

It appears that in building up between the plates the solid first collects upon each side of the several plates around and adjacent the passage formed by the openings or apertures therein, and continues building outwardly from such passage toward the peripheries of the plates.

Consequently as the introduction of the mixture continues, the solid collecting upon or between the plates presents more and more obstruction to the flow of liquid transversely from the passage to the outer extremities of the press, and more of the liquid must pass through more and more of the solid before it reaches and passes through the filtering canvases. It is this formation of solid around the passage formed by the openings in the plates that obstructs the flow of liquid through the press causing a pressure drop which cuts down the rate at which filtering may be carried out, and prevents the formation of a solid cake of the desired dryness.

The openings in the plates are sufficiently large so that there is no material building up of solid in the passage formed thereby until the spaces between the plates have become substantially completely filled with solid or until the filtering operation is almost completed. There is, therefore, during the major portion of the filtering operation a more or less unobstructed passage for the liquid solid mixture, whereby it may distribute itself throughout the length of the press. It is after the mixture has reached the spaces and the liquid starts in its transverse flow through the built up solid cake between the plates in its passage to the filtering canvases that the rate of flow is materially cut down.

We have found that by distributing the solid-liquid mixture more uniformly and equally throughout the entire press through a plurality of passages, the rate at which filtration may be effected is increased, and a drier cake of solid may be formed. This may be accomplished, for example, by providing a plurality of openings or apertures in each of the press plates. Our preferred structure comprises plates having openings uniformly and substantially equidistantly spaced each from another in such manner that the maximum path of travel of liquid transversely of the press from a passage to the filtering canvas of a plate will be less than the radius of said plate. We find that such structure from the standpoint of economy of operation is the most practical. In addition, we prefer to have an extra large space at the feed end of the press so that the incoming mixture may be more readily and equally distributed to the plurality of passages provided by said sets of openings. The advantage gained in the use of our structure is apparently due to the fact that by providing a plurality of passages for the liquid-solid mixture, which passages permit a more or less unobstructed flow of the mixture in a plurality of streams throughout the length of the press during the major portion of the filtering operation, as the operation continues and the solid builds up between the plates there is less thickness of compact solid through which the liquid must pass before reaching the filtering canvases.

In accordance with our invention there may also be provided enlarged spaces between filtering plates or members, at points throughout the length of the press, to further permit a more even and equal distribution at such intervals of the mixture to be filtered.

We are aware of the United States Patent #1,694,956 to Walker which discloses structure, including filtering plates having two openings each, through which the liquid-solid mixture may be distributed throughout the length of the press. But the advantage gained by our invention is not taught by said patent. We have found that to derive the advantage of our invention, during the entire filtering operation, the liquid in its passage transversely of the press from the passages provided by the openings in the plates to the filtering canvases should have to pass through a minimum of built up solid between the plates. There is, of course, a practical limit to the number of passages which may be provided lengthwise of the press, since openings in the plates cut down the effective filtering area, and also a practical limit to the size of openings, since if the openings are too small, solid will build up in the passages provided thereby. However, we do not contemplate limiting our invention to any specific number of passages or specific size of openings. The passages in our structure are large enough to prevent the building up of solid therein, and to permit the passage of the liquid-solid mixture lengthwise of the press in a plurality of substantially unobstructed streams throughout the entire filtering operation. In addition the passages are so disposed that the maximum path of travel of liquid therefrom to the filtering canvases will be less than the radius of the filter plates, thus necessitating the passage of liquid through only small amounts of built up solid between the plates, and in this respect structurally differing from structure heretofore proposed.

In order to more clearly set forth our invention and to illustrate a preferred form of apparatus coming within the scope thereof, reference is had to the accompanying drawing in which:

Fig. 1 is an elevational view of a filter press with parts broken away; and

Fig. 2 is a view taken along line 2—2 of Fig. 1.

Referring to the drawing, 1 represents a filter press plate assembly having a metal disc 2, which may be perforated as shown, and which is provided with a plurality of openings or apertures 3 and 3' of any suitable shape. As illustrated, the opening 3 in the center of the plate is round and the openings 3' which are equidistant from the center and from each other are square. Adjacent each side of the metal plate 2 there is a screen 4, which has openings corresponding in size and location to the openings in the metallic plate.

Overlying the outer surfaces of each of these screens are filtering canvases 5 which likewise have openings corresponding in location to the openings in the metal plate, but of somewhat smaller size since the edges of the canvas are brought together and sewed around the peripheries of the openings in the plate and screens, as shown. The outer edges of the canvas also extend beyond the outer edges of the metallic plate and screens, and are sewed together.

The metal plate 2 has affixed thereto or formed integral therewith suitable lugs or supporting members 6 which are adapted to rest upon the longitudinal bars 7 of the filter press to support the entire filter press plate assembly in the press.

Suitable rivets 8 which have heads 9 on each end thereof, pass through the filter plate and assist in holding the respective parts of the plate together. The heads 9 of the rivets of adjacent plates are adapted to abut against each other, thereby to serve as spacer members to hold such plates apart at the various points at which such rivets are located.

In placing the plates within the press, suitable spacer rings 10 are used to maintain the outer edges of adjacent plates in spaced relation, while a spacer ring 11, somewhat thicker than the spacer rings 10 is placed between the feed end 12 of the filter press and the side of the plate adjacent thereto for maintaining the plate in spaced relation to said end. The feed end 12 of the press has attached thereto or formed integral therewith spacer members 12' which are somewhat thicker than the rivet heads 9 and are adapted to abut against the rivet heads on that side of the particular plate adjacent the feed end, thereby to assist in holding the plate in spaced relation to the press end. Each of the spacer rings 10 and 11 is provided with suitable lugs 13 which are adapted to rest upon the longitudinal bars 7 to support such rings.

As shown in Fig. 2, extra thick spacer rings such as the one marked 11 may also be placed between plates at desired points throughout the length of the press to provide enlarged spaces beween such plates for purposes which will be hereinafter set forth. In such case there are also provided larger rivet heads on the sides of the plates which face each other, to serve as spacing members.

As illustrated the filter press comprises the feed end 12 equipped with feed pipe 14 controlled by valve 15, plates 1, rings 10 and 11, bars 7, plunger 16 having a suitable plunger rod 17, the rod 17 and bars 7 extending to a suitable stationary supporting member not shown, and pan 18 extending below the lowermost portion of the respective filter press plates.

In carrying out a filtration in the apparatus described, assuming that an oil-wax mixture is being filtered and that the press and mixture have been sufficiently chilled beforehand, the mixture is introduced into the press under pressure through the pipe 14, the entire press being held under pressure by means of the plunger 16 and rod 17 which are operated hydraulically or otherwise.

Upon entering the space between the feed end of the press and the first plate, which is large due to the thickness of the spacer ring 11 and spacer members 12', as compared with the space between adjacent plates spaced apart by spacer rings 10 and rivet heads 9, the mixture distributes itself uniformly throughout the press through the various sets of openings in the press plates. In a short time the press becomes filled with the mixture, the liquid passing through the filtering canvases thence to the bottom of the several plates and the collecting pan 18, and the solid material building up in the spaces. The large space provided at the feed end of the press by the spacers 11 and 12' does not fill with solid as rapidly as the smaller spaces between the majority of the plates, and serves as a distributing manifold through which the mixture passes from the feed line 14 to the several passages provided by the various sets of openings in the press plates. In building up a solid cake in the press, the wax more completely separates from the oil in that portion of the press where the oil must travel the least distance through wax cake before it reaches the filtering canvas. Therefore, by providing a plurality of relatively unobstructed streams throughout the press it will be seen that advantage is gained in this respect. Likewise, it will be seen that by providing a plurality of passages more of the mixture may be distributed throughout the press in a given period of time, thus the rate at which filtration may be effected is increased.

By placing extra thick spacer rings 11 between plates at points throughout the length of the press, there are provided additional manifolds which at such points permit a more equal distribution of the mixture to be filtered to the plurality of passages formed by the openings.

While the use of our apparatus has been described in connection with the filtering of an oil wax mixture it is to be understood that its application is not to be limited thereto, and that it may be used for the separation of liquids from solid generally capable of being separated by filtration.

We have found that by the use of our apparatus the rate at which filtration may be carried out may be increased considerably over the rate when using a press of the type hereinbefore described as typical of those now in general use. In the filtration of certain oil-wax mixtures using our preferred type of press as hereinbefore described, such rate was increased approximately one hundred per cent. Furthermore, we have found that the resulting solid cake formed is drier or contains less liquid than the cake previously resulting. We attribute these desirable results to the fact that in our structure there is a plurality of passages lengthwise of the press so disposed as to permit the liquid-solid mixture to be distributed throughout the press more uniformly and which during the entire filtering operation allow the liquid in its passage transversely of the press to reach the filtering canvases by a shorter path than passages in filtering structure heretofore proposed, namely, by a path whose maximum length is less than the radius of the plate. We prefer to have one of such passages in alignment with the inlet, but this is not essential to successful operation of our apparatus.

By providing a plurality of passages lengthwise of the filter press as hereinbefore described, there are established more or less definite zones between adjacent filter plates, to which zones each of the respective passages supplies the material to be filtered. By disposing the several passages so that the distance from a passage to the extremities of the zone supplied by such passage is less than the radius of the plate, or in other words, by limiting the maximum path of travel of liquid transversely of the plate from the passage to that point in the zone at which the liquid passes through the filtering canvas to a distance less than the radius of the plate, there are advantages gained which may not be gained by use of filtering structure heretofore proposed, which advantages have been more particularly pointed out hereinbefore.

It is to be further understood that the structure illustrated in the drawing and described in detail hereinabove is a preferred type of our structure, but that our invention is not to be limited to the specific details thereof. Various other modifications coming within the scope of our concept of invention may suggest themselves to those skilled in the art, which if within the breadth of the appended claims are considered a part of our invention.

We claim:

1. A filter press assembly comprising two end members, one of said end members having an inlet, filter plates between said end members, each of said plates having at least three apertures spaced at intervals from one another such that the maximum distance from any point in the effective filtering area of the plate to an aperture is substantially less than the radius of the effective filtering area of the plate, means between two each of a plurality of plates for holding them at substantially equal intervals apart, and means between the end member having the inlet and the plate facing it for holding such parts at a greater interval from each other than the interval between two plates of said plurality.

2. A filter press assembly comprising two end members, one of said end members having an inlet, filter plates between said end members, each of said plates having at least three apertures each spaced from another so that the maximum distance from any point in the effective filtering area of the plate to an aperture is substantially less than the radius of the effective filtering area of the plate, and so that substantially all of the filtering area is within a distance from an aperture of substantially one-half the radius of the plate, means between two each of a plurality of said plates for holding them at substantially equal intervals apart, and means between the end member having the inlet and the plate facing it for holding such parts at a greater interval from each other than the interval between two plates of said plurality.

3. A filter press assembly comprising two end members, one of said end members having an inlet, filter plates between said end members, each of said plates having at least three apertures, each spaced from another so that the maximum distance from any point in the effective filtering area of the plate to an aperture is substantially less than the radius of the effective filtering area of the plate, and so that substantially all of the filtering area is within a distance from an aperture of substantially one-half the radius of the plate, means between two each of a plurality of said plates for holding them at substantially equal intervals apart, means between one end plate of said plurality and the plate facing it, and between the end member having an inlet and the plate facing it for holding said last mentioned parts at intervals from each other greater than the previously mentioned equal intervals.

4. A filter press assembly comprising two end members, one of said end members having an inlet, filter plates between said end members, each of said plates having at least three apertures spaced at intervals from one another such that the distance from any point in the effective filtering area of the plates to an aperture is substantially less than the radius of the effective filter area of the plate and so that substantially all of the filtering area is within a distance from an aperture of substantially one-half the radius of the plate, and means between two each of a plurality of said plates for holding them at intervals from each other.

In testimony whereof we affix our signatures.

LLOYD B. SMITH.
EDWARD H. TEN BROECK.